July 16, 1963  H. H. JOHNSTON  3,097,550
LUG WRENCH SUPPORT
Filed Nov. 20, 1959  2 Sheets-Sheet 1

Harlow H. Johnston
INVENTOR.

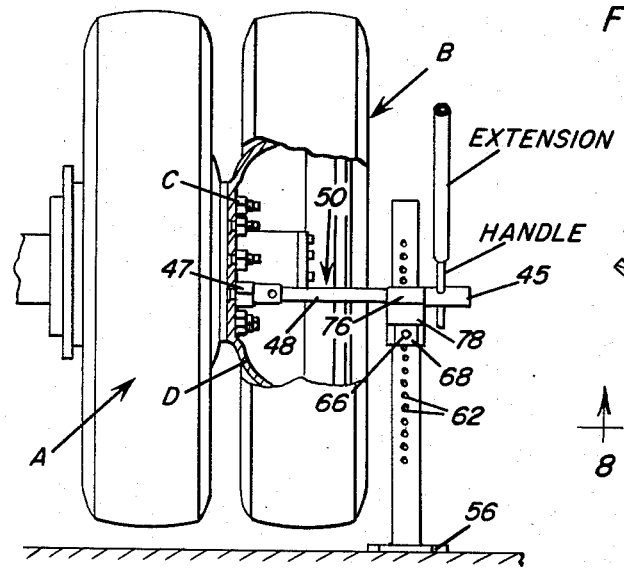
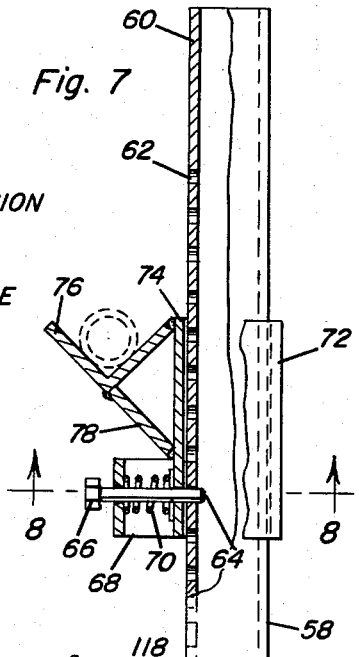
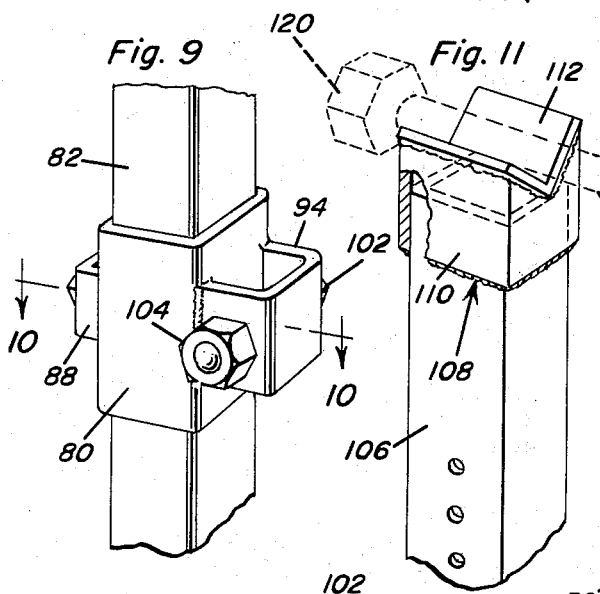

United States Patent Office 3,097,550
Patented July 16, 1963

3,097,550
LUG WRENCH SUPPORT
Harlow H. Johnston, 366 N. 10th St., Sunnyside, Wash.
Filed Nov. 20, 1959, Ser. No. 854,446
6 Claims. (Cl. 81—53)

The present invention relates to a portable support for a readily applicable and removable lug wrench and has reference in particular to a heavy duty type wrench such as is presently being used by truck drivers and others when called upon to remove and thereafter replace a tire.

A general objective in the instant matter is to greatly assist a truck driver in managing the often laborious and time-consuming job of changing tires particularly on the road and when, as is often the case, an assistant is not available to lend a hand in meeting the demands of the job. It is, of course, a matter of common knowledge that the turning force applicable to each lug bolt or nut is necessarily great and one man can but rarely take care of the task satisfactorily. It follows that such wheel and tire-changing difficulties have long since posed a problem. To be sure, others working in this field of endeavor have recognized the problem and a number of contrivances and special adaptations have been proposed to satisfactorily achieve the desired ends. Apparently, prior art appliances and contrivances have fallen short of the desired goal and have for this reason not met with widespread adoption or use. It follows that the objective mentioned involves a more satisfactory solution of the problem and, in doing so, to structurally, functionally and otherwise improve upon prior art lug wrench fulcruming and support devices.

In carrying out the instant invention the construction does not require a specially constructed and often unsuitably adapted attachment for the wheel, the hub or some component of the wheel. Instead, a simple vertically elongated stand is provided. The suitably designed components carried by the stand render it adaptable for practical use with both inner and outer wheels in a dual wheel assembly. That is, the operation is not dependent upon the wheel with which it is being used and, as a matter of fact, is wholly separate and independent from the wheel.

The present invention also features an apt and suitable construction which makes it possible for the user to more effectually apply and increase the force applied because of the fact that the supporting of the shank of the wrench is at the point where the applied force is focused. The invention is usable with the type of lug wrench which is presently regarded, or approximately so, as standard equipment on the largest percentage of trucks now in use on the highways. With this invention it is possible to remove all lugs without turning the truck wheel. What is also important, the construction is such that it may be endorsed as acceptacle to the producer, the distributor, and the consumers or users.

The invention also features a simple efficient portable stand. The stand resembles and, in a manner of speaking, constitutes a jack in that it is vertically adjustable and permits the outer supported and seated end of the lug wrench to be elevated and securely perched for rotary movement when operating the lever-like handle.

Then, too, in carrying out the principles of the invention several forms of shank seating and supporting devices are available for use in order to adapt the invention to accommodate not only a Budd-type lug wrench but an ordinary L-shaped lug wrench too.

Other objects, features and advantages will become more readily apparent from the following description and the accompanying illustrative, but not restrictive, drawings.

In the drawings, wherein like numerals are employed to designate like parts throughout the views:

FIG. 6 is a view showing dual wheels with a portion of the outer wheel broken away to expose the nuts and lugs and showing a double-socketed lug wrench (like the one seen in FIGS. 1 and 2) with the support or stand modified in construction.

FIG. 7 is a view similar to FIG. 3, that is, in section and elevation and on a satisfactorily large scale but showing a modified bracket for cradling an L-type or crank-like lug wrench or the linearly straight type seen in FIG. 6.

FIG. 8 is a cross section on the line 8—8 of FIG. 7.

FIG. 9 is a fragmentary perspective view showing a further modification in the adjustable bracket or adapter.

FIG. 10 is a section on the line 10—10 of FIG. 9; and

FIG. 11 is also a fragmentary view in perspective with a portion broken away showing a still different type of adapter.

Figure 1:
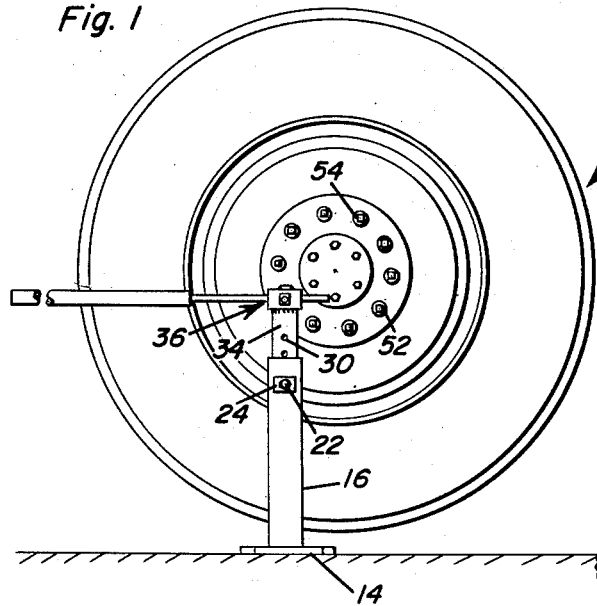
FIG. 1 is a view in side elevation showing the novel lug wrench support and illustrating how it is used in conjunction with an outer ten-stud wheel of a dual wheel assembly, the studs being of the aforementioned Budd-type.
Figure 3:
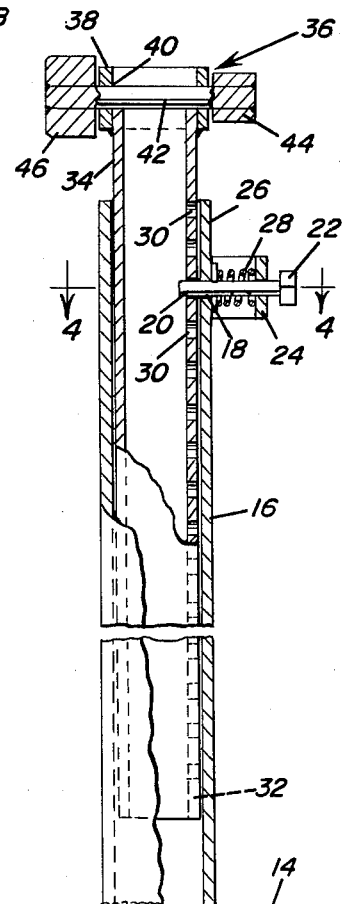
FIG. 3 is a view on a larger scale with parts in section and elevation showing the support illustrated in FIGS. 1 and 2.

It should be explained by way of introduction to the detailed description which is to follow; the invention does not actually involve, it is believed, the wheels or the particular lug bolts or nuts. However, the concept which came into being here was inspired more or less with the idea of enabling a single man to better cope with the wheel-handling jobs in the heavy duty category and wherein the Budd-type lug is involved. In any event, it is unnecessary to either show or describe the various kinds of dual wheels or single wheels or the precise lug bolts. This has been arrived at so that the description may be focused on the invention which may be said to be directed to the stand or support on the one hand and also in combination with a lug wrench.

It will be evident from the above that the illustration of the implement or support in conjunction with a ten-hole Budd-type wheel is merely illustrative and for this reason it is unnecessary to show a wheel construction other than the Budd-type.

In the sense that the stand or support constitutes a mechanical aid and for this reason promotes one-man-operation and is capable of taking the place of a second man, the invention could, of course, be construed as a portable vertically adjustable jack. Broadly, it is of course referred to as an adaptable "support" for lug wrenches of varying forms, means being provided at the top or between the bottom and top, as the case may be, to seat, elevate, and rotatably support the shank portion of a lug wrench. In addition, it would be proper, it is believed, to also treat the device as a stand. In any event, it comprises (FIGS. 1 to 5, inclusive) a suitable base plate 14, a hollow vertical standard 16 attached thereto and rising perpendicularly therefrom and provided at a given point with a latch pin hole 18 to accommodate the latching end 20 of a latch bolt 22 slidingly mounted in a U-shaped fixture 24 welded or otherwise secured to the upper portion of the side wall 26. The latch pin is spring-loaded by way of a coil spring 28 which is confined in the fixture in the manner shown. With this construction, the latching end 20 is projected selectively into one of the keeper holes 30 in the flat side 32 of a hollow vertically adjustable part of the standard. This part or standard member 34 slides up and down in the hollow of the outer standard member 16 providing a telescoping construction. An adapter or bracket is provided and this is denoted, as a unit, by the numeral 36. More specifically it comprises a non-circular collar 38 which is slipped over the upper end portion of the correspondingly shaped standard member 34. This collar is provided with aligned holes providing bearings 40 for a freely turnable spindle or shaft 42. A relatively small non-circular keying head 44 is fixed on the right hand end of the shaft and a larger hexagonal type keying head 46 is fixed on the other end of the shaft. These heads 44 and 46 are selectively usable and in fact they are adapted to fit or telescope into the socket members 45 and 47 at the ends of the straight shank 48 of the Budd-type lug wrench 50. An examination of FIGURE 2 will show how the socket members are utilized. For example, in FIG. 2 the socket member 45 is engaged with one of the tool heads 52 of an outwardly projecting Budd-type lug or bolt 54. At this time the larger socket member 47 is keyed on the turning and supporting head 46. It follows that the head 46 is adapted to telescope and key in the socket member 47 and that the head 44 is adapted to telescope and key in the socket member 45 making the keying and turning heads 44 and 46 alternatively and selectively usable in relation to the socket members on the wrench. When it becomes necessary to change the keying heads, the entire support can be turned bodily around, as seems to be self-evident.

Figure 2:
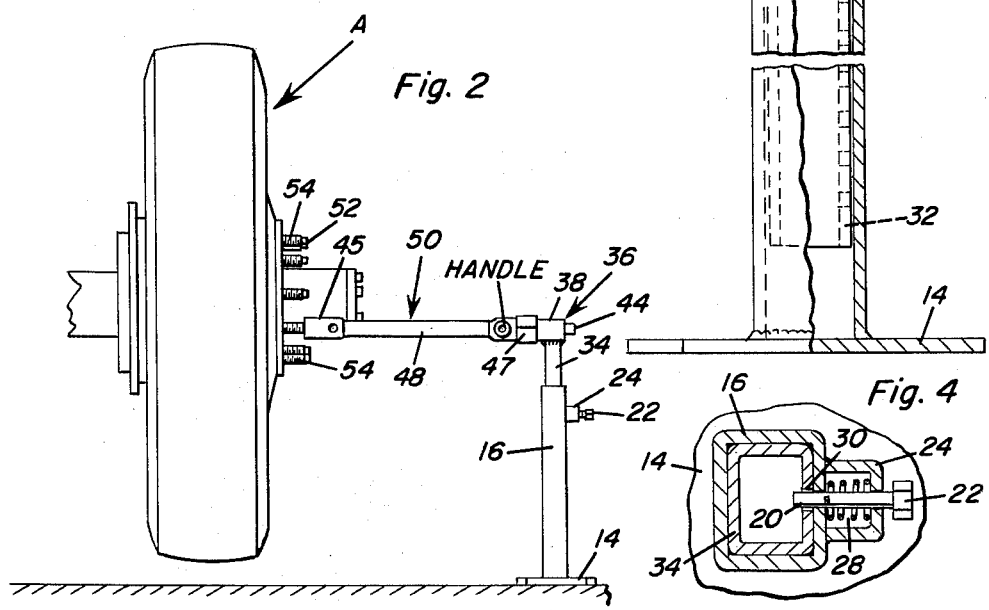
FIG. 2 is a view at right angles of FIG. 1 observing the construction in a direction from left to right and with the outer wheel removed and the support or implement set up for engaging and removing the Budd-lugs from an inner wheel.
Figure 4:
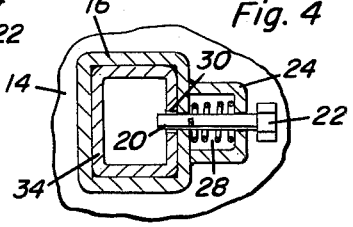
FIG. 4 is a cross section on the horizontal section line 4—4 of FIG. 3, looking in the direction of the arrows.
Figure 5:
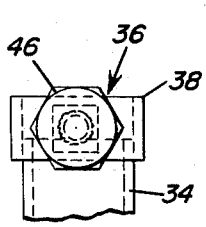
FIG. 5 is an enlarged view of the upper portion showing the unit hereinafter called the adapter and observing the same in a direction from left to right.

In connection with the modification seen in FIGS. 6 and 7 attention is directed to FIG. 7 wherein the stand or support in this instance comprises a similar base or plate 56 having a hollow upright or standard 58, the wall 60 of which is provided with keeper holes or seats 62 for the keeper pin 64 of the latch. This latch pin has a hand trip 66 at the outer end and is slidingly mounted in a fixture 68 mounted on the wall with a coil spring 70 serving to project the latch to its latching position. The adapter bracket and fixture here comprises a vertically adjustable sleeve 72 having one side 74 thereof provided with a substantially V-shaped cradle 76 to permit the shank of the wrench to be supported and cradled therein, freely turned and raised and lowered for proper alignment with the wheel lugs. Incidentally, the inner wheel in FIGS. 1, 2 and 6 is denoted at A and the outer wheel at B. The Budd-lugs have already been identified as 52 and 54 in FIG. 2 and in FIG. 6 the nuts C are mounted on the lugs to clamp the hub portion D of the outer wheel in place. Here again it is to be stated that the wheels and lugs are of no particular significance except to assist in understanding the invention. It may be added, however, that the V-shaped adapter cradle or seat is suitably braced by a stabilizing leg 78 in the manner seen in FIG. 7.

It is within the purview of the invention to also use another or third type of an adapter bracket which is shown in FIG. 9. This arrangement comprises a sleeve 80 slidingly mounted on the hollow tubular standard or upright 82 which, as seen in FIG. 10, has keeper holes 84 for the latch pin 86. The U-fixture 88 (FIG. 10) on one side supports the headed latch pin 90 and the coil spring 92. A second U-shaped fixture 94 is on a diametrically opposite side of the tube and also the sleeve 80 and has bearing holes 96 for the shaft 98 which includes square keying head 102 on one end and a larger hexagonal keying head 104 on the other end.

In the modification seen in FIG. 11 the hollow or tubular standard is denoted at 106 and the adapter is denoted at 108 and comprises a cap 110 welded and fitting fixedly over the upper end of the standard and provided with a V-shaped cradling seat 112. This arrangement serves to accommodate the angle portion 114 of an L-shaped lug wrench 116, the handle of the wrench being denoted at 118 and the socket member at 120.

The advantage of the V-shaped seat construction is that the same lends itself to practical use of almost any type of a lug wrench. In using all of the forms of the invention seen it will be evident that the shank portion of the wrench can be rotatably seated, removably supported, freely turned and the point of stress and strain where the handle imposes the applied forces is focused directly upon the upright or standard of the stand. The construction is even advantageous in that it allows for use of the support with those truck wheels on which the lug bolts are placed near the outside rim of the wheel and which require both the lower and higher settings of the lug wrench support than could be obtained otherwise. The invention shown in FIG. 7 and FIG. 9 are the variations which were designed to permit lower and higher settings of the lug wrench support than would be otherwise obtained.

It is reiterated that this jack-like portable simplified stand or support serves to support the outer end portion of a lug wrench, for example, the aforementioned Budd-type used on truck wheels, while the inner end of the wrench is being applied to the nuts or lugs in the manner illustrated in the drawings. The keying heads where the rotatable type adapter means is employed are designed to fit the respective socketed ends of the lug wrench. Obviously, when the outer end of the lug wrench is engaged with the support means the opposite end is applied to the lug and it is possible for one man, changing a tire mounted on a Budd-type wheel, to apply substantial force on his lug wrench bar, that is, the handle or pinch bar which fits through a hole provided therefor in the shank of the lug wrench, and to use an extension, if desired, on the pinch bar. Heretofore, it has been extremely difficult for one man to apply sufficient pressure to remove these hard-to-loosen wheel lugs.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A lug wrench support comprising an enlarged base, a standard attached to and rising vertically from the base, an adapter comprising a collar operatively mounted on the upper end of the standard, said collar having bearings, a shaft mounted for free rotation in said bearings, said shank being provided on its opposite ends with fixedly mounted selectively usable keying and wrench-turning heads, said heads being adapted to fit telescopically into socket members at the ends of the shank portion of a wrench and said heads varying in cross-sectional shape and size.

2. The structure defined in claim 1 and wherein said standard comprises an outer tubular member provided with a spring-loaded latch, and an inner member telescoping into the outer member and provided with selectively usable keeper holes with which a cooperating end portion of the latch may cooperate.

3. A lug wrench support embodying a portable standard, a sleeve slidingly mounted on said standard and embracing the standard, said sleeve being provided on one side with a U-shaped member having a spring-loaded latch, said standard having keeper holes and said latch providing a keeper pin for adjustable retaining relationship with said keeper holes, a U-shaped bracket on an opposite side of the sleeve and having bearings, a shaft mounted for rotation in said bearings, a keying head fixed on one end of the shaft, and a second keying head fixed on the other end of the shaft, said keying heads being of different cross-sectional shapes and sizes.

4. For use in removing and replacing the mounting fasteners of a vehicle wheel, a stand which is portable, a lug wrench having an elongated shank with a pair of different size socket members on opposite ends each adapted for engagement with said fasteners, a transversely extending shaft journaled on the upper end portion of said stand and having a pair of heads secured to the opposite ends thereof complementary to and receivable in the corresponding ones of said socket members for rotatably supporting a selected end portion of said wrench for rotation about its longitudinal axis, and an enlarged base on the lower end of said stand for engagement with a supporting surface to support said stand in an upright position.

5. The combination of claim 4 wherein said wrench includes laterally projecting handle means.

6. The combination of claim 4 wherein said stand includes a vertically adjustable part from which said shaft is supported.

References Cited in the file of this patent

UNITED STATES PATENTS

| | | |
|---|---|---|
| 1,151,088 | Culbertson | Aug. 24, 1915 |
| 1,685,445 | Bash | Sept. 25, 1928 |
| 1,688,525 | Cowart | Oct. 23, 1928 |
| 1,775,402 | Mandl | Sept. 9, 1930 |
| 1,877,768 | Koester | Sept. 20, 1932 |
| 2,267,012 | Bowne | Dec. 23, 1941 |
| 2,467,827 | Hinton | Apr. 19, 1949 |
| 2,705,119 | Ingwer | Mar. 29, 1955 |
| 2,761,340 | Harrington | Sept. 4, 1956 |
| 2,818,290 | Harocopo | Dec. 31, 1957 |
| 2,880,008 | Stoner | Mar. 31, 1959 |
| 2,911,867 | Ross | Nov. 10, 1959 |
| 2,960,895 | Richards | Nov. 22, 1960 |

FOREIGN PATENTS

| | | |
|---|---|---|
| 1,328,900 | Germany | Nov. 17, 1955 |